United States Patent [19]

Krenzer

[11] Patent Number: 5,800,100
[45] Date of Patent: Sep. 1, 1998

[54] DRILLING TOOL WITH RESET INSERTS

[75] Inventor: Ulrich Krenzer, Zirndorf, Germany

[73] Assignee: Kennametal Hertel AG Werkzeuge + Hartstoffe, Fürth, Germany

[21] Appl. No.: 836,144

[22] PCT Filed: Dec. 11, 1995

[86] PCT No.: PCT/EP95/04871

§ 371 Date: Jun. 9, 1997

§ 102(e) Date: Jun. 9, 1997

[87] PCT Pub. No.: WO96/18471

PCT Pub. Date: Jun. 20, 1996

[30] Foreign Application Priority Data

Dec. 10, 1994 [DE] Germany ............... 44 44 023.5
Oct. 14, 1995 [DE] Germany ............... 195 38 390.7

[51] Int. Cl.$^6$ .................................................. B23B 51/02
[52] U.S. Cl. ..................... 408/224; 407/113; 408/230; 408/713
[58] Field of Search ................... 408/223, 224, 408/230, 713, 227; 407/113, 114

[56] References Cited

U.S. PATENT DOCUMENTS

| | | | |
|---|---|---|---|
| 4,367,991 | 1/1983 | Grafe et al. | 408/224 |
| 4,946,318 | 8/1990 | David et al. | 407/114 |
| 5,454,671 | 10/1995 | Qvarth | 407/113 |
| 5,466,097 | 11/1995 | Wallstrom | 407/113 |
| 5,503,509 | 4/1996 | Von Haas et al. | 408/224 |
| 5,622,461 | 4/1997 | Tukala et al. | 408/713 |

FOREIGN PATENT DOCUMENTS

| | | |
|---|---|---|
| 0054913 | 6/1982 | European Pat. Off. . |
| 0181844 | 5/1986 | European Pat. Off. . |
| 0502541 | 9/1992 | European Pat. Off. . |
| 2730418 | 1/1979 | Germany . |
| 4018043 | 12/1991 | Germany . |

Primary Examiner—Daniel W. Howell
Attorney, Agent, or Firm—Nils H. Ljungman and Associates

[57] ABSTRACT

The invention pertains to a drilling tool for drilling in solid metal. It comprises a base body with flutes for chip removal and two interchangeable inserts (1) designed especially as reset bits, having the same shape and size and being arranged in a recess at the end of a flute at the front of the base body. The inserts (1) are situated at different radial distances from the drilling tool axis (30) with overlapping work ranges. The blade (4,4a) of the insert (1) is formed by two cutting edges (10, 10a) and (14, 14a) which together form an obtuse point angle (18). The insert (1) is characterized by an extended form in its longitudinal direction L with channel-like troughing of its faces (3) running essentially in the longitudinal direction and by an arrangement of the blades (4,4a) at the channel ends. Furthermore, the channel has a base surface (9) which with its longer parallelogram sides (6,7) forms an acute angle (8) with the longitudinal axis (2) of the insert (1). The shorter parallelogram sides form the one cutting edge (10, 10a) of an insert blade (4, 4a). The channel also comprises two lateral faces (12, 12a) flanking the longer parallelogram sides (6, 7) of the base surface (9), rising at an obtuse angle (31) from the base surface (9) and in each case forming an obtuse triangle. The base of this triangle coincides with one of the longer parallelogram sides (6, 7) in each case. The short legs of this triangle form other cutting edges (14, 14a) which together with an adjoining shorter parallelogram side of the base surface (9) form an insert blade (4, 4a).

20 Claims, 11 Drawing Sheets

DRILLING TOOL WITH RESET INSERTS

BACKGROUND OF THE INVENTION

1. Field of the Invention

This invention relates to a drilling tool for drilling in solid metal, with a base body with chip flutes for the chip removal, with two cutting inserts each located in respective recesses on the end of a respective chip flute, which inserts are interchangeable, have the same shape and size, and are preferably realized in the form of reset inserts. Each insert has a different radial distance from the drill axis, the working areas of which inserts are adjacent to one another with some overlap, and two cutting edges are in contact with one another to form an obtuse point angle to form a blade.

2. Background Information

Conventional drilling tools of the prior art are generally equipped with "neutral" reset inserts, which means that they can also be used in a similar manner for turning or milling tools. But precisely when they are used in drilling operations, they cannot be used to achieve optimal results.

The most widely used drilling tools are trigon reset inserts (German Patent No. 27 30 418 C2, German Patent No. 40 18 843 A1, European Patent No. 54 913 B1). The indexable inserts described in these prior art documents have been found to be useful for larger drilling tools which have a drill diameter of more than 25 mm, and they are economical. Given a correct positioning of the inner and outer blades, the use of these reset inserts guarantees a stable, balanced cutting action with only low drift forces. The inserts can be positioned at almost any angle in the base body. With drill diameters of less than 25 mm, the interchangeable trigon inserts of the prior art have the disadvantage of a very small carbide volume, as a result of which they cannot be subjected to high thermal and mechanical loads. Therefore drilling tools for smaller drill diameters generally have a longer, more rectangular shape (European Patent No. 181 844 B1). The blade geometry of the trigonal reset inserts of the prior art has been transferred largely unchanged to these essentially rectangular inserts, resulting in a significant increase in stability. One disadvantage of drilling tools which use such rather rectangular reset inserts, however, is that when the inserts are used in drilling tools which have helical chip flutes, the portion of the drill which holds the reset insert interferes with the chip removal. For the removal of the chips formed during drilling, a low-friction separation between the chips and the blade edges is necessary, for which purpose large angles of twist are advantageous. On account of the amount of space available, reset inserts which have a rectangular outline are more difficult to install than the trigon inserts of the prior art. A repositioning of the insert to balance the cutting force is therefore difficult. On such inserts, and at high speeds, an equalization of the cutting force which has been achieved by unequal distribution between the inner and outer blade causes a major imbalance, and thus has a negative effect on the result of the drilling operation. On the drilling tool of the prior art, the chip space of the outer blade is also relatively small, although this space is required to handle approximately three-quarters of the volume of the chips.

OBJECT OF THE INVENTION

The object of the invention is to combine the improved stability of rectangular reset inserts with the favorable centering characteristics of trigon inserts, and to guarantee a favorable chip removal from the drilling area.

SUMMARY OF THE INVENTION

The invention teaches that this object can be accomplished by a shape of the inserts which is extended in a longitudinal direction of the inserts, with a channel like trough which runs essentially in the longitudinal direction of the cutting surface sides of the inserts and with blades located on the ends of the channel; whereby the channel contains a base surface which has the approximate outline of a parallelogram and, with regard to the longer sides of the parallelogram, forms an acute angle with the longitudinal axis of the inserts; the shorter sides of the parallelogram form the one cutting edge of a blade; and two lateral surfaces each in the shape of an obtuse triangle, each of which flanks the two longer parallelogram sides of the base surface, each rise out of the base surface at an obtuse angle; the base side of each of which coincides with one of the longer parallelogram sides and the short leg of which, as additional cutting edges together with an adjacent shorter parallelogram side of the base surface forming the cutting edges form an insert blade. As a result of the configuration of the inserts of a drilling tool as claimed by the invention, one essential advantage achieved is an equalization of the cutting force. This equalization is achieved by the channel-shaped troughing and in particular by the cutting edges of the insert blade, which are at an obtuse point angle to one another. As a result of the angled arrangement of the blade edges, viewed in the cutting direction or in the plane of the blade, the radially outward drift of the drilling tool is reduced. The channel-shaped configuration of the inserts means that a chip which is removed from the workpiece has already been deformed to a significant extent into its desired shape, namely a chip spiral. Following this deformation, the chip impacts the wall of the chip space which is adjacent to the insert in the chip discharge direction at an obtuse angle, i.e. with reduced friction. The chip removal is thereby improved by the configuration of a drilling tool as claimed by the invention.

The stability in the range of action of a drilling tool is improved in particular if a ratio of length to width of the inserts is maintained between 1.2 and 1.8. The cutting properties of the drilling tool as claimed by the invention can be optimized if an obtuse point angle of 135 degrees to 165 degrees is maintained between the cutting edges which form the insert.

BRIEF DESCRIPTION OF THE DRAWINGS

Additional advantages of the invention are described in greater detail below, with reference to the embodiments which are illustrated in the accompanying drawings.

DESCRIPTION OF THE PREFERRED EMBODIMENT

Figure 1:
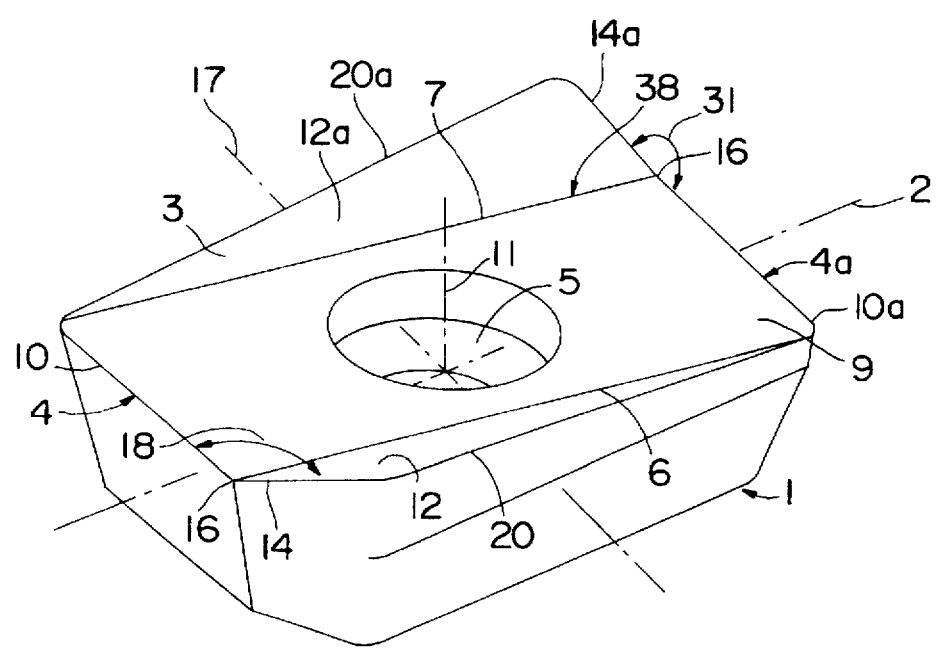
FIG. 1 shows, in a perspective view, an insert as claimed by the invention which is realized in the form of a reset insert.
Figure 2:
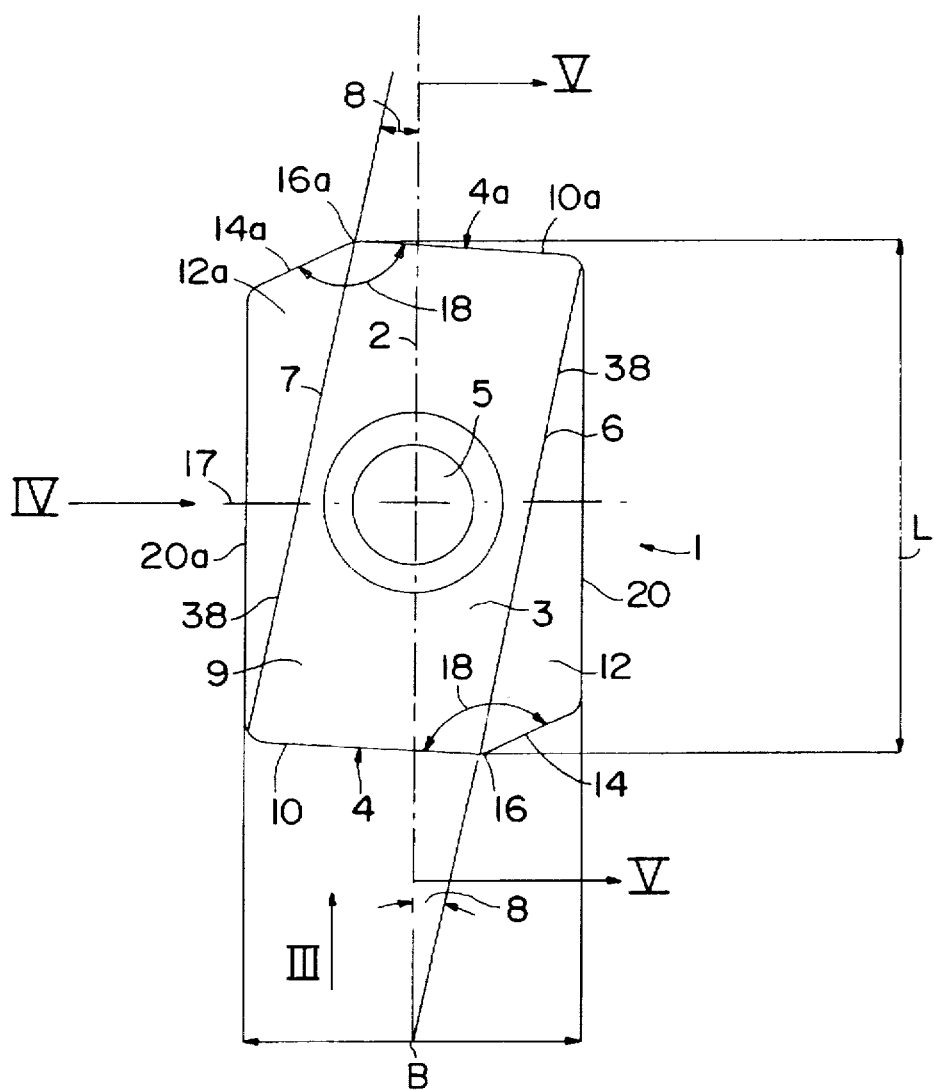
FIG. 2 shows an overhead view of an insert as illustrated in FIG. 1.

The insert 1 which is illustrated in views from several different angles in FIGS. 1–5 is essentially rectangular, but is extended in the direction of its longitudinal axis 2. Its cutting surface side 3 has a trough-like channel, and its blades 4, 4a are formed in the vicinity of the two ends of the channel.

The channel contains a base surface 9 which has approximately the outline of a parallelogram, the longer parallel sides 6, 7 of which form an acute angle 8 with the longitudinal axis 2. Its shorter parallelogram sides form the one cutting edge 10 and 10a of the respective blades 4 and 4a. Located in the center of the insert 1 there is a fixing hole 5, the boring axis 11 of which runs orthogonally to the longitudinal axis 2 and to the supporting surface 15 of the inserts or to their plane.

The channel also contains two lateral faces 12, 12a which flank the longer parallel sides 6, 7 of the channel, each of which lateral faces is in the form of an obtuse triangle, the base side of each of which coincides with one of the longer parallel sides 6, 7, and the short legs of which, as additional cutting edges 14 and 14a, together with the shorter parallelogram sides next to them of the base area 9, namely of the cutting edges 10 and 10a, together form insert blades 4 or 4a with the blade tips 16 and 16a respectively. The ratio between the length L and the width B of the insert 1 is between approximately 1.2 and 1.8. The two cutting edges 10, 14 and 10a, 14a, each of which pairs forms an insert blade 4 and 4a respectively, are at an obtuse point angle 18 of approximately 135 degrees to 165 degrees to one another.

The longer legs of the obtuse angle triangle which define the lateral faces 12 and 12a each form the secondary blades 20, 20a of the insert 1. The secondary blades 20, 20a, each form an acute angle 19 with the base area 9 and with the plane defined by the longitudinal axis 2 and the transverse axis 17 of the insert 1, or form an acute angle 19 with the longitudinal axis 2 of the insert 1, the value of which acute angle 19 is approximately 5 degrees to 20 degrees. In the right-hand cutting drilling tools illustrated in the accompanying figures, the channel, the orientation of which is largely defined by the base area 9, is rotated clockwise (FIG. 1), and in left-hand cutting tools, the channel is rotated counterclockwise. In other words, the inserts for left-hand cutting tools are symmetrical to those used for right-hand cutting tools, whereby starting from FIG. 2, the plane of symmetry contains the double arrow designated L, and the plane of symmetry runs orthogonally to the plane of the insert 1 or to the plane of the drawing.

Figure 7:
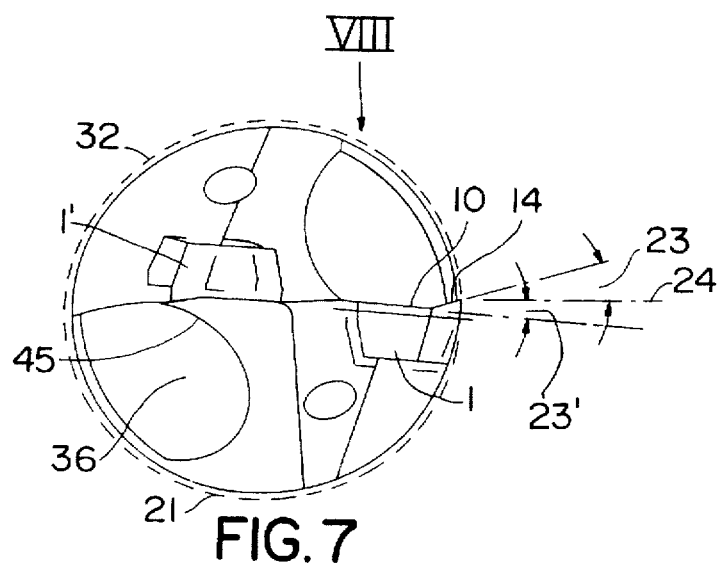
FIG. 7 shows an overhead view of the tip area of the drilling tool illustrated in FIG. 6.

The inserts are each inserted in a locating recess which is located in a tip area of a drilling tool 21, where they are fixed in position by means of a fastening screw 22, for example. They are positioned so that the angle of inclination 23 of the radially outer cutting edge 14 of the lateral face 12 of an insert 1 is larger than the angle of inclination 23' of the radially inner cutting edge (FIG. 7). The angle of inclination 23' of the radially inner cutting edge 10 can even have a negative value. The reference plane is the tool reference plane 24.

Figure 15:
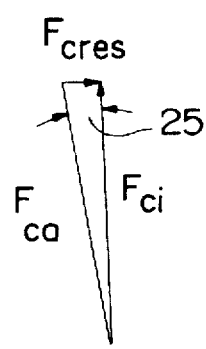
FIG. 15 shows a force triangle illustrating the force resulting from the principal cutting forces.
Figure 16:
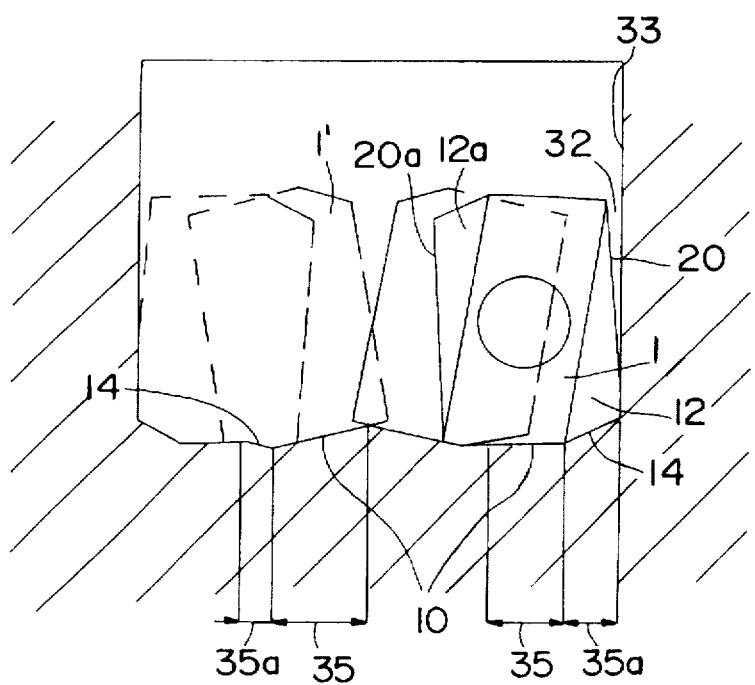
FIG. 16 is a cross section of a hole drilled in a workpiece, in which the overlaps of two inserts located on a rotating drilling tool are illustrated schematically.

If all the partial cutting forces which act on the individual inserts 1, 1' are added together, the result is a principal cutting force $F_{ci}$ which is oriented toward the radially inner insert 1', and a principal cutting force $F_{ca}$ which acts on the radially outer insert 1. These two principal cutting forces, as a result of the different angles of inclination 23 and 23', in connection with the resulting widths of contact 35, run toward one another on the radially outer and radially inner inserts 1 at an acute angle 25 (FIG. 15). The resulting force $F_{cres}$ of these two principal cutting forces, by means of the lever arm 26 (FIG. 13), creates a torque in the direction of the radially outer insert 1. The lever arm 26 extends from the chucking point 27 of the drill shank to the cutting plane 28. The above-mentioned widths of contact 35 are illustrated in FIG. 16. The width of contact 35 of the cutting edge 10 is smaller on the radially outer insert 1 than on the radially inner insert 1'. The width of contact 35a of the cutting edge 14, on the other hand, is larger on the radially outer insert 1 than on the radially inner insert 1'. In other words, the outer insert 1 works completely on the cutting edge 14 and partly on the cutting edge 10. The inner insert 1 works practically completely on the cutting edge 10 and partly on the cutting edge 14.

Figure 8:
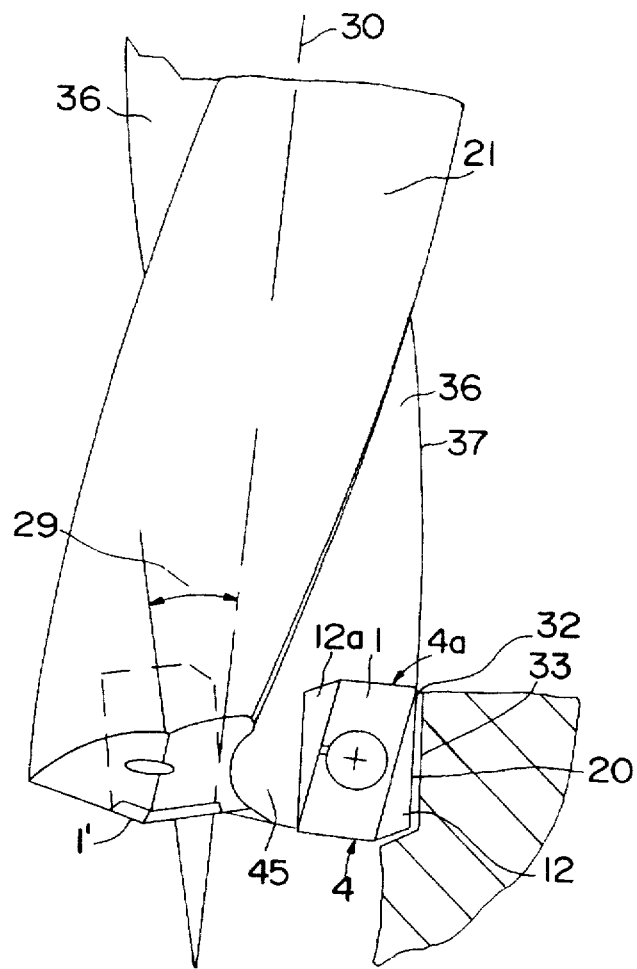
FIG. 8 shows a side view of the drill illustrated in FIG. 7, in the direction indicated by Arrow VIII.
Figure 9:
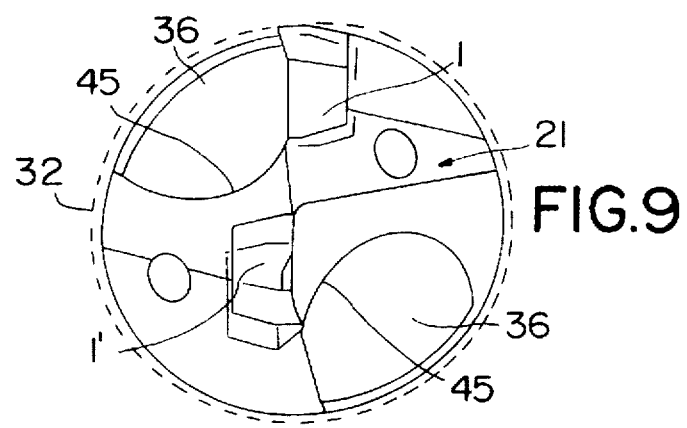
FIGS. 9 and 10 show two views which correspond to FIGS. 7 and 8, whereby the drilling tool has been rotated by 90 degrees clockwise from the position illustrated in FIGS. 7 and 8.
Figure 12:
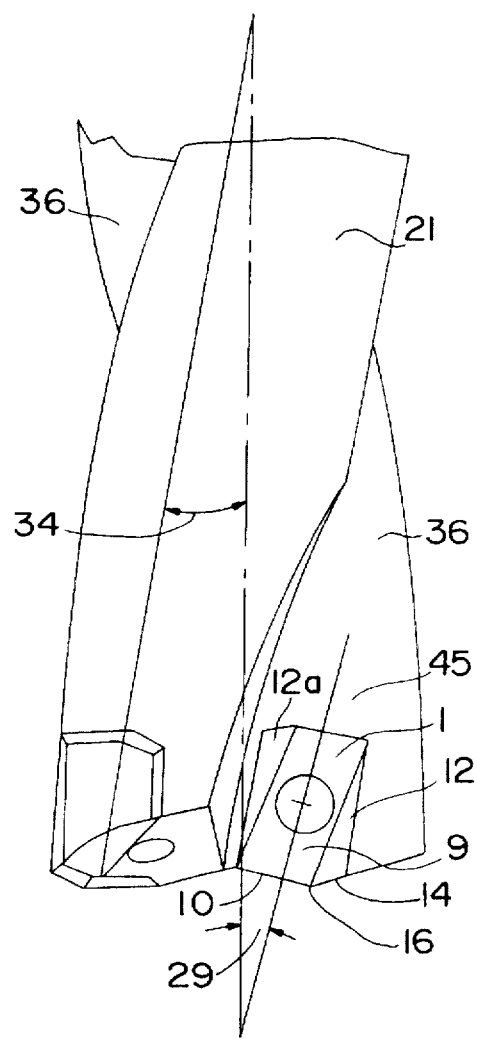
Figure 13:
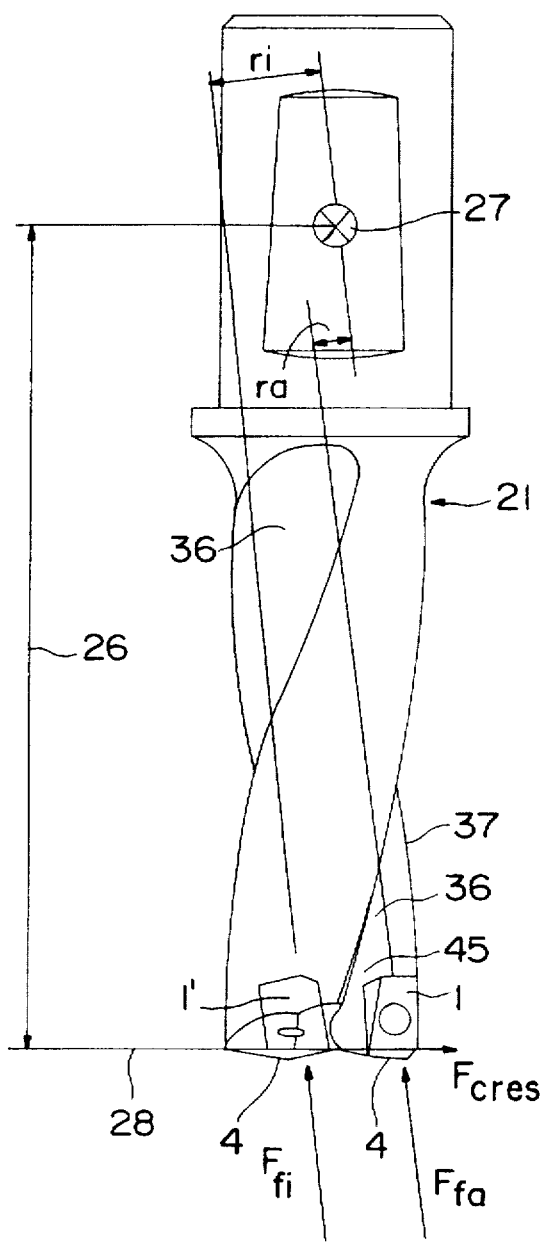
FIG. 13 shows a side view of a drilling tool as claimed by the invention, in which the forces involved are illustrated.
Figure 14:
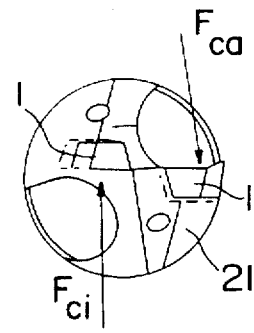
FIG. 14 illustrates the principal cutting forces which act on the inserts.

The radially inward insert 1' is positioned so that it is inclined toward the drilling tool axis at an angle 29 of 5 to 15 degrees which closes toward the tip of the drill (FIGS. 8, 12, 13). The radially outer insert 1, on the other hand, assumes an angular position with respect to the drilling tool axis 30 such that its secondary blades 20, 20a which are located on the periphery of the drill have sufficient clearance 32 with respect to the wall 33 of the hole. In other words, there is an angle 34 which opens toward the drill tip between the longitudinal axis 2 of the insert 1 and the drilling tool axis 30. The angles 29 and 34 are each measured in the tool reference plane 24 (FIGS. 7, 9, 11, 14). The angle 34 which produces the clearance is between 0 degrees and 10 degrees.

As a result of the positioning of the two reset bits explained above when installed, the thrust forces which act on the inserts 1, 1' are combined into principal thrust forces $F_{fi}$ and $F_{fa}$, whereby the former force acts on the inner insert 1' and the latter force on the outer insert 1. The directions of action of the principal thrust forces $F_{fi}$ and $F_{fa}$, as shown in FIG. 13, extend at an angle to the drilling tool axis 30, and form an acute angle with the latter. Resulting from this diagonal action of the principal thrust forces $F_{fi}$ and $F_{fa}$, there are radial force components which, via the lever arms ra for the blades 4 and 4a of the outer insert 1 and via the lever arms ri for the blades 4 and 4a of the inner insert 1', at the chucking point 27 of the drilling tool 21, generate a torque which presses the drill tip of the drilling tool 21 away from the wall 33 of the boring toward the drilling tool axis 30 or toward the axis of the borehole. On the drill claimed by the invention, the moments which result from the thrust forces and the cutting forces are directed opposite to one another, and thereby essentially cancel one another out. The following relationship applies for the moments applied to the drill:

$$F_{cre}\times\text{lever arm } 26 = F_{fi}\times\text{lever arm } ri + F_{fa}\times\text{lever arm } ra.$$

Figure 10:
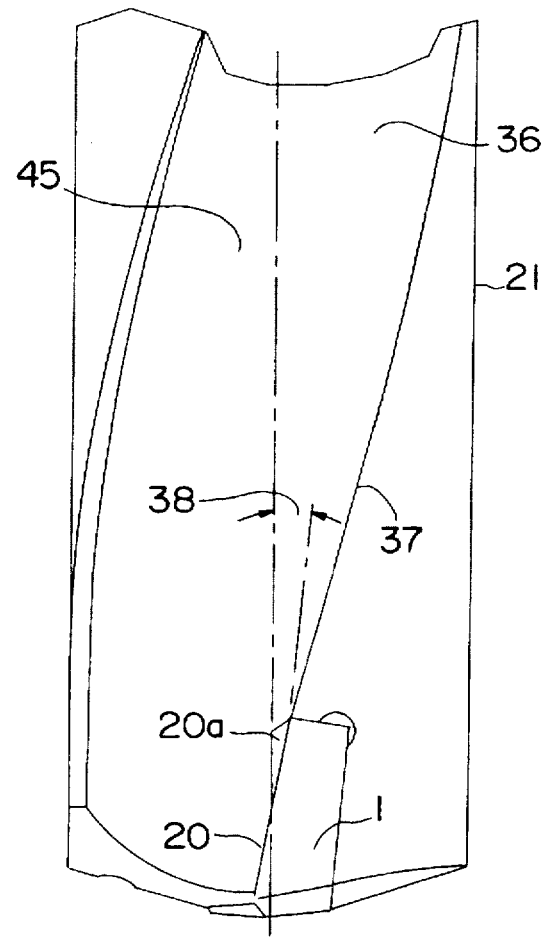
Figure 11:
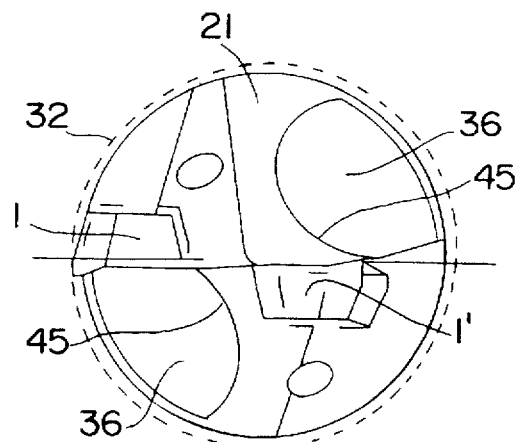
FIGS. 11 and 12 show a drilling tool as illustrated in FIGS. 7 and 8, but rotated by 180 degrees clockwise.

In the installed position, each insert 1, 1' assumes an orientation which is at an acute angle in terms of the position of its base surface 9 with respect to the tool reference plane 24 which contains the drilling tool axis 30. The acute orientation angle 38 (FIG. 10) closes toward the drill tip. The secondary blades 20 and 20a therefore run almost continuously with the line of twist 37 formed by the chip flutes 36 and the peripheral surface of the drill base body. Such an arrangement guarantees a low-friction removal of the chips.

Figure 3:
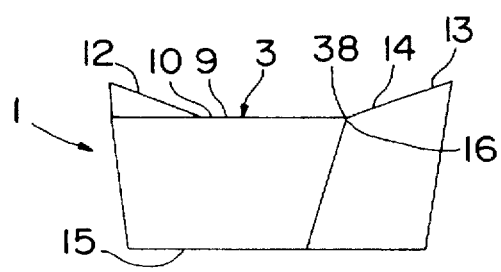
FIG. 3 shows a side view in the direction indicated by Arrow III in FIG. 2.
Figure 4:
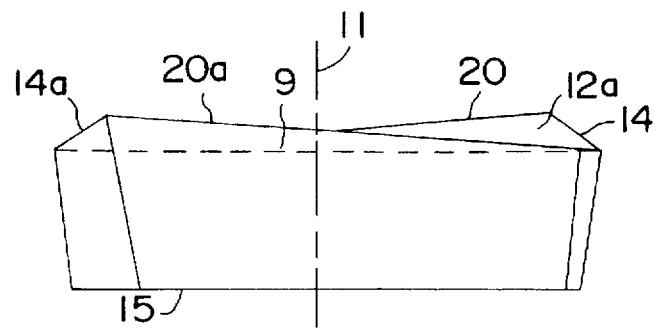
FIG. 4 shows a view in the direction of Arrow IV in FIG. 2.
Figure 5:
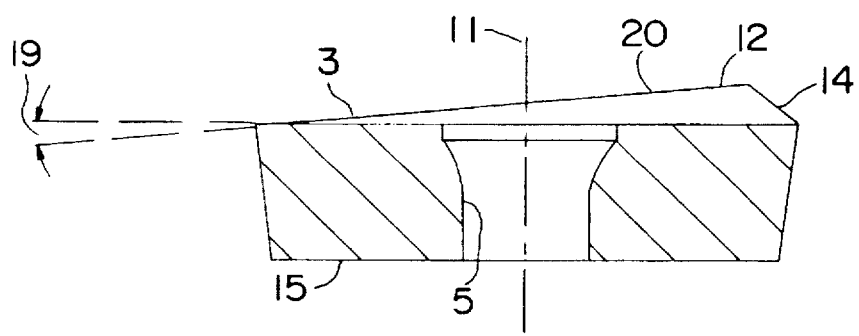
FIG. 5 shows a longitudinal section along Line V—V in FIG. 2.
Figure 6:
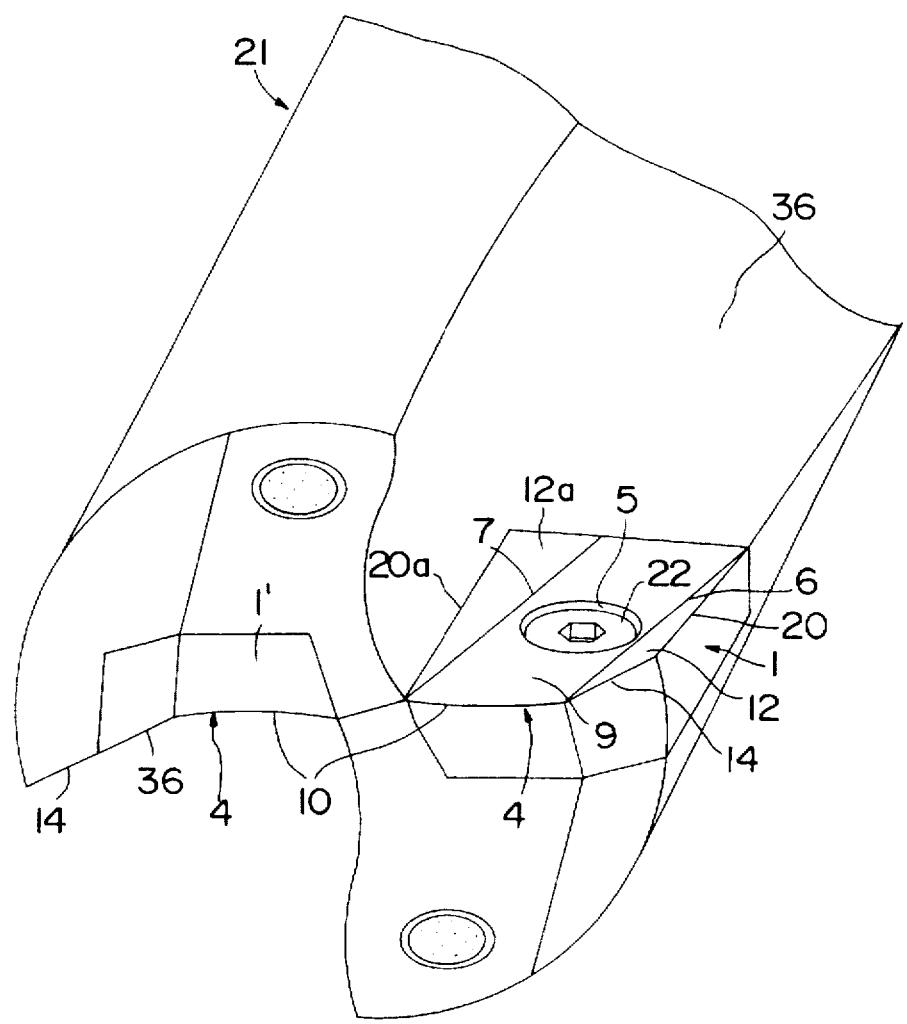
FIG. 6 shows a perspective view of the tip area of a drilling tool as claimed by the invention with two reset inserts.
Figure 17:
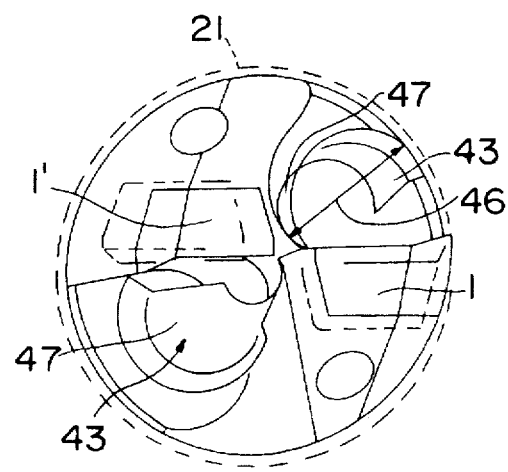
FIG. 17 and 18 are two illustrations which correspond to FIGS. 7 and 8, and each of which illustrates the formation of a chip.
Figure 18:
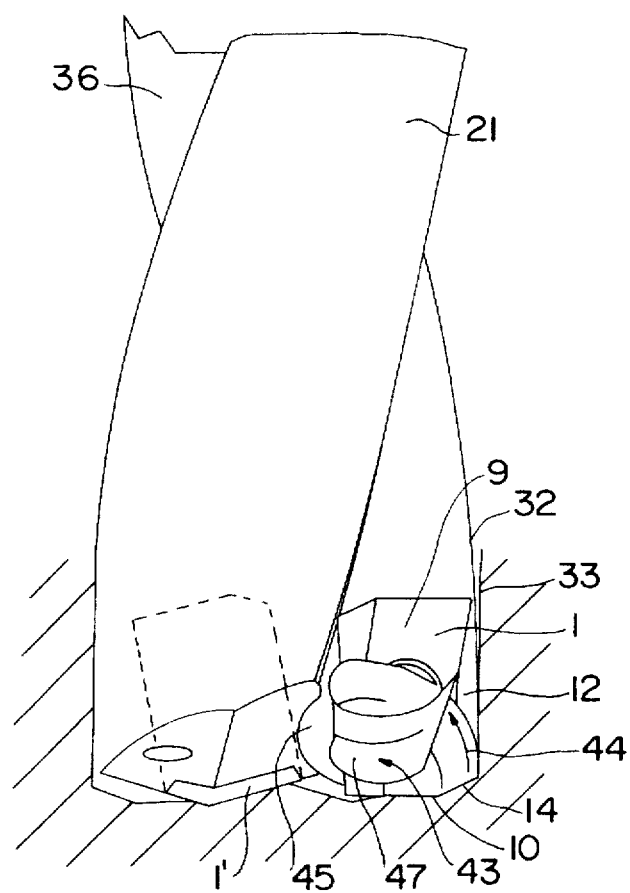
Figure 19:
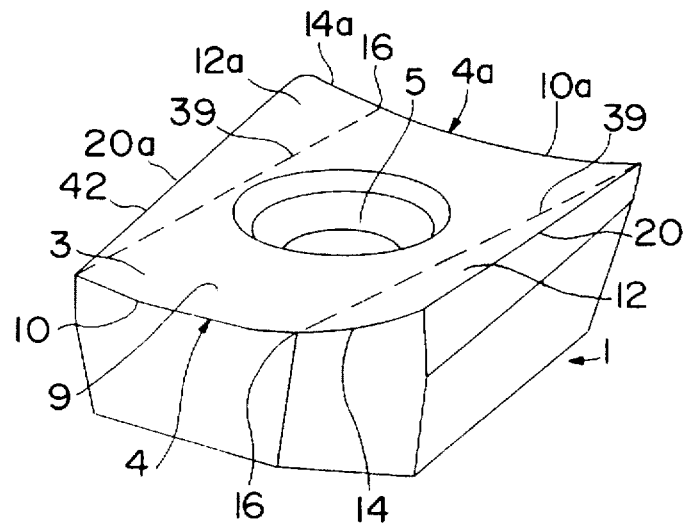
FIG. 19 illustrates one embodiment of an insert in which both the transitions between the base body and the inclined lateral surfaces are continuous, and in which the base surface and the lateral surfaces are concavely troughed.
Figure 20:
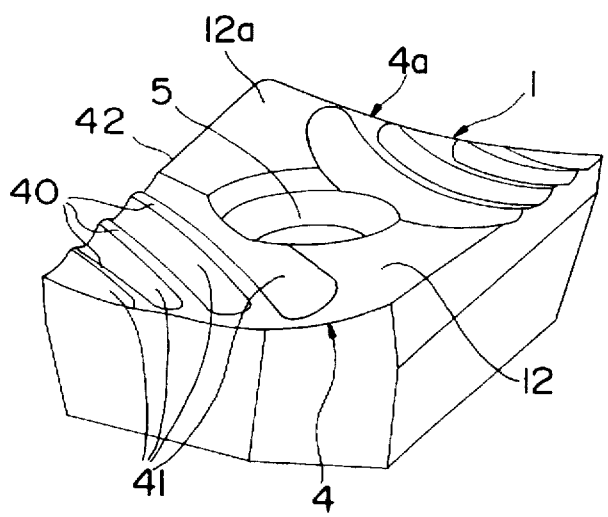
FIG. 20 shows an insert as shown in FIG. 19, in which there are also chip shaping ribs and chip shaping grooves in the chip face of the insert.

The inserts claimed by the invention are explained as if the surfaces which form the cutting surfaces of the two blades 4, 4a, namely the base surface 9 and the two lateral surfaces 12, 12a are ideally flat surfaces which adjoin one another in the manner of a distinct bend 38 (FIGS. 1, 3), in the vicinity of the longer parallelogram sides 6, 7, at an obtuse angle 31 (FIG. 3). The transitions between these surfaces 9, 12 and 12a which form the cutting surface and the cutting surface side 3 respectively, however, need not be designed with a clear sudden bend. Under some conditions, it may be advantageous if the transition is smooth and rounded, as shown in the embodiments illustrated in FIGS. 19 and 20. To clearly illustrate the transition between the base surface 9 and the lateral surfaces 12, 12a, FIG. 19 includes the dashed lines 39. The above-mentioned surfaces which form the cutting surface of the insert 1, namely the base surface 9 and the lateral surfaces 12, 12a, do not need to be flat. They can have a slightly concave trough, and thereby have a continuously rounded cross sectional shape, like the cross sectional shape of a gutter, for example. Such a cross sectional shape is shown in FIGS. 19 and 20. On the insert illustrated in FIG. 20, there are additional chip guide steps in the form of chip guide ribs 40 and chip guide grooves 41 which are worked into the side 3 of the cutting surface. The chip guide ribs 40 and the chip guide grooves 41 run from the blade 4 or 4a along a curved path toward the radially inward flank area 42 of the insert 1, when the insert is in the installed position. As a result of this path, the chips 43 (FIGS. 17, 18) which are removed from the bottom of the borehole are guided into the chip space of the drilling tool 21. The chip guide ribs 40 and chip guide grooves 41, at the moment of creation of the chip 43, are reproduced at least partly on the rear surface 47 of the chip 43 facing the cutting surface side 3 of the insert 1, as a result of which there is a compulsory guidance of the chip 43 in the chip removal direction 44.

One major advantage of the invention is that the chips which are formed during the drilling process are shaped by the channel shape of both the inner and the outer inserts 1 and 1' so that they impact the inner wall 45 of the chip space at an obtuse angle, and the chips have already been shaped by the channel shape of the inserts, so that the diameter of the spiral chip fits easily into the available chip space. The diameter of the chip spirals formed is therefore smaller than, or in any case equal to the depth 46 (FIG. 17) of the respective chip space. In conventional interchangeable insert drills, the inserts form an almost plane outer surface. At this point, in conventional drills the chips are first deflected on the base body, which is made of rather soft material. On the tool as claimed by the invention, however, the chips have already been shaped in the area of contact with the inserts, which are made of hard material, so that the chips no longer cause any significant wear on the base body, and roll without kinking along the chip space available. The chip spirals formed in this manner result in a smooth chip removal process.

One feature of the invention resides broadly in the drilling tool for drilling in solid metal, with a base body with chip flutes for the chip removal, with two cutting inserts 1 each located in respective recesses on the end of a respective chip flute, which inserts 1 are interchangeable, have the same shape and size, and are preferably realized in the form of reset inserts, each insert with a different radial distance from the drill axis 30, the working areas of which are adjacent to one another with some overlap, two cutting edges 10, 14 and 10a, 14a respectively are in contact with one another to form an obtuse point angle 18 to form a blade 4 and 4a respectively, characterized by a shape of the inserts 1 which is extended in a longitudinal direction L of the inserts 1, with a channel like trough which runs essentially in the longitudinal direction L of the cutting surface sides 3 of the inserts 1 and with blades 4, 4a located on the ends of the channel, whereby the channel contains a base surface 9 which has the approximate outline of a parallelogram and, with regard to the longer sides 6, 7 of the parallelogram, forms an acute angle 8 with the longitudinal axis 2 of the inserts, the shorter sides of the parallelogram form the one cutting edge 10, 10a of a blade 4, 4a , —and two lateral surfaces 12, 12a, each in the shape of an obtuse triangle, and each of which flanks the two longer parallelogram sides 6, 7 of the base surface 9 and rises out of the base surface 9 at an obtuse angle 38, the base side of each of which coincides with one of the longer parallelogram sides 6, 7, and the short leg of which, as additional cutting edges 14, 14a together with an adjacent shorter parallelogram side of the base surface forming the cutting edges 10, 10a, form an insert blade 4, 4a.

Another feature of the invention resides broadly in the tool characterized by a ratio of length L to width B of the inserts between 1.2 and 1.8.

Yet another feature of the invention resides broadly in the tool characterized by an obtuse point angle 18 of approximately 135 degrees to 165 degrees between the cutting edges 10, 14 and 10a, 14a respectively forming the one blade 4 and 4a respectively.

Still another feature of the invention resides broadly in the tool characterized by the fact that the longer legs of the obtuse triangle form the secondary blades 20, 20a of the insert, which with the base surface 9 form an acute angle, the acute angle 19 between the secondary blades 20, 20a and the base surface 9 or the longitudinal axis 2 of the insert 1 is 5 degrees to 20 degrees.

A further feature of the invention resides broadly in the tool characterized by an inclined profile of the secondary blades 20, 20a, but whereby in an overhead view, i.e. in a view perpendicular to their plane or to their support surface 15, they run parallel to one another.

Another feature of the invention resides broadly in the tool characterized by the fact that in the installed position, the value of the angle of inclination 23 of the radially outer cutting edge 14 is greater than the value of the angle of inclination 23' of the radially inner cutting edge 10.

Yet another feature of the invention resides broadly in the tool characterized by the fact that the radially inward insert 1', with regard to the path of its longitudinal axis 2, with the drill axis 30, forms an angle which opens toward the drill shank and, measured in the tool reference plane 24, is approximately 5–15 degrees.

Still another feature of the invention resides broadly in the tool characterized by the fact that the radially outer insert 1 is inserted at an angle 34 with respect to the drilling tool axis 30, which angle opens toward the drill tip and is measured in the tool reference plane such that its secondary blade 20, 20a has sufficient clearance 22 with respect to the boring wall 33.

A further feature of the invention resides broadly in the tool characterized by an angle 34 of 0 degrees to 10 degrees.

Another feature of the invention resides broadly in the tool characterized by the fact that the secondary blade 20 of the radially outer insert 1 runs more or less continuously into the line of twist 37 formed by the chip flutes and the peripheral surface of the base body.

Yet another feature of the invention resides broadly in the tool characterized by the fact that the transitions between the base surface 9 and the lateral surfaces 12 and 13 are rounded continuously.

Still another feature of the invention resides broadly in the tool characterized by the fact that the base surface 9 and the lateral surfaces 12, 13 are rounded so that they form a channel which has an essentially continuously rounded cross sectional shape.

The invention as described hereinabove in the context of the preferred embodiments is not to be taken as limited to all of the provided details thereof, since modifications and variations thereof may be made without departing from the spirit and scope of the invention.

| | | | |
|---|---|---|---|
| 1 | Cutting insert | 24 | Tool reference plane |
| 2 | Longitudinal axis | 25 | Acute angle |
| 3 | Cutting surface side | 26 | Lever arm |
| 4, 4a | Blade | 27 | Chucking point |
| 5 | Fixing hole | 28 | Cutting plane |
| 6 | Longer side of parallelogram | 29 | Angle |
| | | 30 | Drilling tool axis |
| 7 | Longer side of parallelogram | 31 | Obtuse angle |
| | | 32 | Clearance |
| 8 | Acute angle | 33 | Boring wall |
| 9 | Base surface | 34 | Angle |
| 10 | Cutting edge | 35 | Width of contact |
| 10a | Cutting edge | 35a | Width of contact |
| 11 | Boring axis | 36 | Chip flute |
| 12 | Lateral surface | 37 | Line of twist |
| 12a | Lateral surface | 38 | Bend |
| 14 | Cutting edge | 39 | Line |
| 14a | Cutting edge | 40 | Chip guide rib |
| 15 | Support surface | 41 | Chip guide groove |
| 16 | Cutting tip | 42 | Flank area |
| 16a | Cutting tip | 43 | Chip |
| 17 | Transverse axis | 44 | Chip removal direction |
| 18 | Point angle | 45 | Chip space wall |
| 19 | Angle of inclination | 46 | Depth |
| 20 | Secondary blade | 47 | Rear surface |
| 20a | Secondary blade | | |
| 21 | Drilling tool | | |
| 22 | Fastening screw | | |
| 23 | Angle of inclination | | |
| 23' | Angle of inclination | | |

What is claimed is:

1. A drilling tool for drilling in solid metal, said drilling tool comprising:

a base body;

said base body having an axis of rotation;

a drill tip disposed at a free end of said base body;

said base body comprising a first chip flute and a second chip flute to carry chips away from said drill tip;

a first cutting insert and a second cutting insert;

said first cutting insert being disposed on said first chip flute;

said second cutting insert being disposed on said second chip flute;

said first cutting insert being disposed a first radial distance from the axis of rotation;

said second cutting insert being disposed a second radial distance from the axis of rotation;

the first radial distance being different from the second radial distance;

said first cutting insert being disposed to cut material from a first working area of a work piece;

said second cutting insert being disposed to cut material from a second working area of a work piece;

said first working area partially overlapping with said second working area;

each of said cutting inserts comprising a first end and a second end;

each of said cutting inserts being configured to extend substantially in a longitudinal direction substantially between said first end and said second end;

each of said cutting inserts having a longitudinal axis extending in the longitudinal direction;

each of said cutting inserts comprising a cutting surface;

said cutting surface being configured as a trough-like channel extending in substantially the longitudinal direction substantially between said first end and said second end;

said cutting surface comprising a first cutting blade and a second cutting blade;

said first cutting blade being disposed on said first end;

said second cutting blade being disposed on said second end;

said channel comprising a base surface extending substantially in the longitudinal direction;

said base surface being configured to be shaped substantially as a parallelogram;

said parallelogram comprising two long sides disposed opposite one another;

said parallelogram comprising two short sides disposed opposite one another;

said long sides of said parallelogram being dimensioned substantially longer than said short sides of said parallelogram;

said long sides of said parallelogram being disposed to form an acute angle with the longitudinal axis of a respective one of said cutting inserts;

a first one of said short sides of said parallelogram being configured to form a first cutting edge of said first cutting blade;

a second one of said short sides of said parallelogram being configured to form a first cutting edge of said second cutting blade;

said channel comprising two lateral surfaces;

a first of said two lateral surfaces being disposed adjacent to a first of said two long sides of said parallelogram;

a second of said two lateral surfaces being disposed adjacent to a second of said two long sides of said parallelogram;

each of said two lateral surfaces being disposed at an obtuse angle with respect to said base surface;

each of said two lateral surfaces being configured to be shaped substantially as an obtuse triangle;

each of said obtuse triangles comprising a first side, a second side, and a third side;

said first side being dimensioned longer than said second side;

said first side being dimensioned longer than said third side;

said first side of said triangle of said first lateral surface being disposed adjacent to said first long side of said parallelogram;

said first side of said triangle of said second lateral surface being disposed adjacent to said second long side of said parallelogram;

said second side of said triangle of said first lateral surface being disposed and configured to form a second cutting edge of said first cutting blade; and said second side of said triangle of said second lateral surface being disposed and configured to form a second cutting edge of said second cutting blade.

2. The drilling tool according to claim 1, wherein:

each of said cutting inserts have a length dimension extending substantially along the longitudinal axis;

each of said cutting inserts have a width dimension extending substantially transverse to the longitudinal axis; and a ratio of the length dimension of said cutting inserts to the width dimension of said cutting inserts is between 1.2 and 1.8.

3. The drilling tool according to claim 2, wherein:

said first cutting edge of said first cutting blade and said second cutting edge of said first cutting blade form an angle of 135 degrees to 165 degrees therebetween; and said first cutting edge of said second cutting blade and said second cutting edge of said second cutting blade form an angle of 135 degrees to 165 degrees therebetween.

4. The drilling tool according to claim 3, wherein:

said third side of said triangle of said first lateral surface is disposed and configured to form a first secondary blade;

said third side of said triangle of said second lateral surface is disposed and configured to form a second secondary blade;

said base surface is disposed in a plane;

said first secondary blade is disposed to form an angle between said first secondary blade and the plane of said base surface;

the angle formed between said first secondary blade and the plane of said base surface is between 5 degrees and 20 degrees;

said second secondary blade is disposed to form an angle between said second secondary blade and the plane of said base surface; and the angle formed between said second secondary blade and the plane of said base surface is between 5 degrees and 20 degrees.

5. The drilling tool according to claim 1, wherein:

said third side of said triangle of said first lateral surface is disposed and configured to form a first secondary blade;

said third side of said triangle of said second lateral surface is disposed and configured to form a second secondary blade;

said base surface is disposed in a plane;

said first secondary blade is disposed to form an angle between said first secondary blade and the plane of said base surface;

the angle formed between said first secondary blade and the plane of said base surface is between 5 degrees and 20 degrees;

said second secondary blade is disposed to form an angle between said second secondary blade and the plane of said base surface; and the angle formed between said second secondary blade and the plane of said base surface is between 5 degrees and 20 degrees.

6. The drilling tool according to claim 4, wherein:

said first secondary blade has a projected image onto the plane of said base surface in a direction perpendicular to the plane of said base surface;

said second secondary blade has a projected image onto the plane of said base surface in a direction perpendicular to the plane of said base surface;

the projected image of said first secondary blade is substantially parallel to the projected image of said second secondary blade; and said first and second cutting inserts being configured to be interchangeable.

7. The drilling tool according to claim 6, wherein:

said base body has a tool reference plane intersecting the axis of rotation;

said first cutting edge of said first cutting blade is disposed radially towards the axis of rotation upon said first cutting blade being disposed in a cutting position;

said second cutting edge of said first cutting blade is disposed radially away from the axis of rotation upon said first cutting blade being disposed in a cutting position;

said first cutting edge of said first cutting blade forms a first angle of inclination with the tool reference plane;

said second cutting edge of said first cutting blade forms a second angle of inclination with the tool reference plane; and said second angle of inclination is greater than said first angle of inclination.

8. The drilling tool according to claim 7, wherein:

the first radial distance of said first cutting insert is less than the second radial distance of said second cutting insert;

the longitudinal axis of said first cutting insert is disposed at an angle with respect to said axis of rotation; and the angle of the longitudinal axis of said first cutting insert is between 5 degrees and 15 degrees and closes towards said drill tip.

9. The drilling tool according to claim 8, wherein:

the longitudinal axis of said second cutting insert is disposed at an angle with the axis of rotation;

the angle of the longitudinal axis of said second cutting insert opens towards said drill tip; and the angle of the longitudinal axis of said second cutting insert is dimensioned to provide clearance between said secondary cutting blade and a wall of a hole cut in a work piece by said drilling tool.

10. The drilling tool according to claim 9, wherein the angle of the longitudinal axis of said second cutting insert is between 0 degrees and 10 degrees.

11. The drilling tool according to claim 10, wherein:

said base body comprises a peripheral surface disposed to face away from the axis of rotation;

a portion of said peripheral surface is disposed adjacent said second chip flute;

said portion of said peripheral surface and said second chip flute join to form a line of twist; and said first secondary cutting blade of said second cutting insert is disposed to be substantially continuously in line with said line of twist upon said first secondary cutting blade being disposed in a cutting position.

12. The drilling tool according to claim 11, wherein:

said channel comprises a first portion disposed at a first transition between said base surface and said first lateral surface;

said channel comprises a second portion disposed at a second transition between said base surface and said second lateral surface;

said first portion of said channel is configured to be rounded continuously between said base surface and said first lateral surface; and said second portion of said channel is configured to be rounded continuously between said base surface and said second lateral surface.

13. The drilling tool according to claim 12, wherein said base surface and said two lateral surfaces are configured to form said channel with a continuously rounded cross sectional shape.

14. A drilling tool for drilling in solid metal, said drilling tool comprising:

a base body;

said base body having an axis of rotation;

a drill tip disposed at a free end of said base body;

said base body comprising a first chip flute and a second chip flute to carry chips away from said drill tip;

a first cutting insert and a second cutting insert;

said first cutting insert being disposed on said first chip flute;

said second cutting insert being disposed on said second chip flute;

said first cutting insert being disposed a first radial distance from the axis of rotation;

said second cutting insert being disposed a second radial distance from the axis of rotation;

the first radial distance being different from the second radial distance;

each of said cutting inserts comprising a first end and a second end;

each of said cutting inserts being configured to extend substantially in a longitudinal direction substantially between said first end and said second end;

each of said cutting inserts having a longitudinal axis extending in the longitudinal direction;

each of said cutting inserts comprising a cutting surface;

said cutting surface being configured to extend in substantially the longitudinal direction substantially between said first end and said second end;

said cutting surface comprising a cutting blade disposed on said first end;

said cutting surface comprising a base surface extending substantially in the longitudinal direction;

said base surface comprising a first side and a second side;

said first side of said base surface being configured and disposed to form a first cutting edge of said cutting blade;

said second side of said base surface being disposed to form an acute angle with the longitudinal axis;

said cutting surface comprising a lateral surface;

said lateral surface being disposed adjacent to said second side of said base surface;

said lateral surface being disposed at an obtuse angle with respect to said base surface;

said lateral surface comprising a first side and a second side;

said first side of said lateral surface being disposed adjacent said first side of said base surface; and said second side of said lateral surface being disposed and configured to form a second cutting edge of said cutting blade.

15. The drilling tool according to claim 14, wherein:

each of said cutting inserts have a length dimension extending substantially along the longitudinal axis;

each of said cutting inserts have a width dimension extending substantially transverse to the longitudinal axis; and a ratio of the length dimension of said cutting inserts to the width dimension of said cutting inserts is between 1.2 and 1.8.

16. The drilling tool according to claim 15, wherein said first cutting edge of said cutting blade and said second cutting edge of said cutting blade form an angle of 135 degrees to 165 degrees therebetween.

17. The drilling tool according to claim 16, wherein: said lateral surface comprises a third side;

said third side of said lateral surface is disposed and configured to form a secondary blade;

said base surface is disposed in a plane;

said secondary blade is disposed to form an angle between said secondary blade and the plane of said base surface; and the angle formed between said secondary blade and the plane of said base surface is between 5 degrees and 20 degrees.

18. The drilling tool according to claim 17, wherein:

said base body has a tool reference plane intersecting the axis of rotation;

said first cutting edge of said cutting blade is disposed radially towards the axis of rotation upon said cutting blade being disposed in a cutting position;

said second cutting edge of said cutting blade is disposed radially away from the axis of rotation upon said cutting blade being disposed in a cutting position;

said first cutting edge of said cutting blade forms a first angle of inclination with the tool reference plane;

said second cutting edge of said cutting blade forms a second angle of inclination with the tool reference plane;

said second angle of inclination is greater than said first angle of inclination;

the first radial distance of said first cutting insert is less than the second radial distance of said second cutting insert;

the longitudinal axis of said first cutting insert is disposed at an angle with respect to said axis of rotation;

the angle of the longitudinal axis of said first cutting insert is between 5 degrees and 15 degrees and closes towards said drill tip;

the longitudinal axis of said second cutting insert is disposed at an angle with the axis of rotation;

the angle of the longitudinal axis of said second cutting insert opens towards said drill tip;

the angle of the longitudinal axis of said second cutting insert is dimensioned to provide clearance between said secondary cutting blade and a wall of a hole cut in a work piece by said drilling tool;

the angle of the longitudinal axis of said second cutting insert is between 0 degrees and 10 degrees;

said base body comprises a peripheral surface disposed to face away from the axis of rotation;

a portion of said peripheral surface is disposed adjacent said second chip flute;

said portion of said peripheral surface and said second chip flute join to form a line of twist;

said secondary cutting blade of said second cutting insert is disposed to be substantially continuously in line with said line of twist upon said secondary cutting blade being disposed in a cutting position;

said cutting surface comprises a portion disposed at a first transition between said base surface and said lateral surface; and said portion of said cutting surface is configured to be rounded continuously between said base surface and said lateral surface.

19. A cutting insert for being disposed on a chip flute of a drilling tool, said drilling tool for drilling in solid metal, said drilling tool comprising: a base body; said base body having an axis of rotation; a drill tip disposed at a free end of said base body; said base body comprising a first chip flute and a second chip flute to carry chips away from said drill tip; said cutting insert comprising:

a first end and a second end;

a shape configured to extend substantially in a longitudinal direction substantially between said first end and said second end;

a longitudinal axis extending in the longitudinal direction;

a cutting surface;

said cutting surface being configured to extend in substantially the longitudinal direction substantially between said first end and said second end;

said cutting surface comprising a cutting blade disposed on said first end;

said cutting surface comprising a base surface extending substantially in the longitudinal direction;

said base surface comprising a side;

said side of said base surface being configured to form a first cutting edge of said cutting blade;

said cutting surface comprising a lateral surface disposed adjacent to said base surface;

said lateral surface being disposed at an obtuse angle with respect to said base surface;

said lateral surface comprising a side;

said side of said lateral surface being disposed and configured to form a second cutting edge of said cutting blade; and said first cutting edge being disposed at an obtuse angle with said second cutting edge.

20. The cutting insert according to claim 19, wherein:

said first cutting edge has a length;

said second cutting edge has a length; and the length of said first cutting edge is substantially different from the length of said second cutting edge.

* * * * *